US007969515B2

(12) United States Patent
Sugihara et al.

(10) Patent No.: US 7,969,515 B2
(45) Date of Patent: Jun. 28, 2011

(54) VIDEO DISPLAY APPARATUS AND METHOD

(75) Inventors: Ryohei Sugihara, Machida (JP); Yoichi Iba, Hachioji (JP)

(73) Assignee: Olympus Corporation, Tokyo (JP)

( * ) Notice: Subject to any disclaimer, the term of this patent is extended or adjusted under 35 U.S.C. 154(b) by 1217 days.

(21) Appl. No.: 11/646,031

(22) Filed: Dec. 27, 2006

(65) Prior Publication Data

US 2007/0222703 A1 Sep. 27, 2007

(30) Foreign Application Priority Data

Mar. 23, 2006 (JP) ................................ 2006-080093

(51) Int. Cl.
*H04N 5/66* (2006.01)
*H04N 3/14* (2006.01)

(52) U.S. Cl. ....................................... 348/739; 348/792

(58) Field of Classification Search .................. 348/739, 348/22, 790, 792, 51–60; 345/204, 690; *H04N 5/66, H04N 9/12, 13/04, 3/14*
See application file for complete search history.

(56) References Cited

U.S. PATENT DOCUMENTS

| | | | | |
|---|---|---|---|---|
| 6,803,901 | B1 | 10/2004 | Numao | |
| 7,030,848 | B2 | 4/2006 | Sato et al. | |
| 2002/0113866 | A1* | 8/2002 | Taniguchi et al. | 348/51 |
| 2002/0196220 | A1 | 12/2002 | Sato et al. | |
| 2004/0017348 | A1 | 1/2004 | Numao | |
| 2005/0046951 | A1* | 3/2005 | Sugihara et al. | 359/619 |
| 2006/0114204 | A1 | 6/2006 | Sato et al. | |
| 2006/0119566 | A1 | 6/2006 | Sato et al. | |
| 2010/0091040 | A1* | 4/2010 | Morgan | 345/690 |

FOREIGN PATENT DOCUMENTS

| | | | |
|---|---|---|---|
| JP | 2001-183622 | A | 7/2001 |
| JP | 2003-215535 | A | 7/2003 |
| JP | 2006-10935 | A | 1/2006 |

* cited by examiner

*Primary Examiner* — Sherrie Hsia
(74) *Attorney, Agent, or Firm* — Holtz, Holtz, Goodman & Chick, PC

(57) ABSTRACT

A video display apparatus displays videos corresponding to a plurality of observers respectively and comprises a display device. A control unit controls a scan timing so that a sum of a video scanning period from an upper end to a lower end of the display device concerning one video input into the display device and a response period in the lower end of the display device is smaller than a field period of the video. The control unit allows an illumination system to emit light between the end of the response period of the lower end and the start of scanning of the next video in the upper end of the display device.

10 Claims, 18 Drawing Sheets

VIDEO DISPLAY APPARATUS AND METHOD

CROSS-REFERENCE TO RELATED APPLICATIONS

This application is based upon and claims the benefit of priority from prior Japanese Patent Application No. 2006-080093, filed Mar. 23, 2006, the entire contents of which are incorporated herein by reference.

BACKGROUND OF THE INVENTION

1. Field of the Invention

The present invention relates to a video display apparatus and a video display method capable of simultaneously observing videos which are different according to viewing directions.

2. Description of the Related Art

There has heretofore been known a liquid crystal display apparatus (hereinafter referred to as an MVD) by which it is possible to simultaneously observe videos which are different according to viewing direction. In the MVD, illuminative backlights having directivities in two different directions are alternately switched in synchronization with a time when different videos are alternately displayed in a time sharing manner in the liquid crystal display apparatus. Such a constitution is disclosed in, for example, Jpn. Pat. Appln. KOKAI Publication No. 2006-10935.

FIG. 19 shows the behavior of driving the MVD by normal scanning. First, a video of a right field (hereinafter referred to as the right video) is scanned from an upper end of a screen based on a vertical synchronous signal in scan timing 1, scanned in the center of the screen in scan timing 2, and scanned in a lower end of the screen in scan timing 3, successively. After the video has been scanned in the lower end of the screen, a video (hereinafter referred to as the left video) of a left field is then scanned from the upper end of the screen.

Graphs of displayed images (1 to 3) show behaviors in which the right video and the left video are alternately displayed in the upper end, the center and the lower end of the screen.

Moreover, an example of image quality improvement of a dynamic video is disclosed in Jpn. Pat. Appln. KOKAI Publication No. 2001-183622. A technology concerning the image quality improvement in liquid crystal display of a field sequential driving system is disclosed in Jpn. Pat. Appln. KOKAI Publication No. 2003-215535.

BRIEF SUMMARY OF THE INVENTION

A first aspect of the present invention is directed to a video display apparatus capable of displaying videos corresponding to a plurality of observers, respectively, the apparatus comprising a display device; a display device driving circuit which drives the display device; an illumination system which switches an illuminating direction of the display device; and a control unit which controls the display device driving circuit to alternately input different videos into the display device and which switches the illuminating direction of the illumination system in synchronization with the input of each video to thereby display in the display device the different videos in a time sharing manner, wherein the control unit controls a scan timing so that a sum of a video scanning period from an upper end to a lower end of the display device concerning one video input into the display device and a response period in the lower end of the display device is smaller than a field period of the video; and the control unit allows the illumination system to emit light between the end of the response period of the lower end and the start of scanning of the next video in the upper end of the display device.

A second aspect of the present invention is directed to a video display apparatus capable of displaying videos corresponding to a plurality of observers, respectively, the apparatus comprising a display device; a display device driving circuit which drives the display device; an illumination system which switches an illuminating direction of the display device; and a control unit which controls the display device driving circuit to alternately input different videos into the display device and which switches the illuminating direction of the illumination system in synchronization with the input of each video to thereby display in the display device the different videos in a time sharing manner, wherein the control unit inserts, between one video and the next video to be input into the display device, a reset signal to reset the one video; the control unit allows the illumination system to start light emission at the earliest timing that is a timing when a transmittance of a lower end of the display device is brought into a shield state in response to the reset signal from a state where the lower end of the display device displays one video; and the control unit allows the illumination system to stop the light emission at the latest timing that is a timing when display of the next video is started in an upper end of the display device.

A third aspect of the present invention is directed to the video display apparatus according to the second aspect, wherein the control unit allows the illumination system to start the light emission at a timing when the display of the next video is started after the transmittance of the lower end of the display device has been brought into the shield state; and the control unit allows the illumination system to stop the light emission at a timing when a transmittance of the upper end of the display device is brought into a shield state in response to the reset signal from a state where the upper end of the display device displays the next video.

A fourth aspect of the present invention is directed to the video display apparatus according to the second or third aspect, wherein the control unit sets the timings of the start and the stop of the light emission of the illumination system between the timing when the transmittance is brought into the shield state and the timing when the display of the next video is started so that quantities of lights to be transmitted through the upper end and the lower end of the display device in one scan with respect to the same signal are substantially equal to each other.

A fifth aspect of the present invention is directed to a video display apparatus capable of displaying videos corresponding to a plurality of observers, respectively, the apparatus comprising a display device; a display device driving circuit which drives the display device; an illumination system which switches an illuminating direction of the display device; and a control unit which controls the display device driving circuit to alternately input different videos into the display device and which switches the illuminating direction of the illumination system in synchronization with the input of each video to thereby display in the display device the different videos in a time sharing manner, wherein the control unit inserts, between one video and the next video to be input into the display device, a reset signal to reset the one video; the control unit allows the illumination system to start light emission between a time when a transmittance of the display device is brought into a shield state in response to the reset signal from a state where the lower end of the display device displays one video and a time when display of the next video is started in the lower end of the display device; and the control unit allows the illumination system to stop the light emission between the time when the transmittance of the display device is brought into the shield state in response to the reset signal from a state where an upper end of the display device displays the next video and a time when display of the further next video is started in the upper end of the display device.

A sixth aspect of the present invention is directed to a video display method which displays videos corresponding to a plurality of observers, respectively, by use of a video display apparatus comprising a display device; a display device driving circuit which drives the display device; an illumination system which switches an illuminating direction of the display device; and a control unit which controls the display device driving circuit to alternately input different videos into the display device and which switches the illuminating direction of the illumination system in synchronization with the input of each video to thereby display in the display device the different videos in a time sharing manner, the method comprising the steps of: controlling a scan timing so that a sum of a video scanning period from an upper end to a lower end of the display device concerning one video input into the display device and a response period in the lower end of the display device is smaller than a field period of the video; and allowing the illumination system to start light emission between the end of the response period of the lower end and the start of scanning of the next video in the upper end of the display device.

A seventh aspect of the present invention is directed to a video display method which displays videos corresponding to a plurality of observers, respectively, by use of a video display apparatus comprising a display device; a display device driving circuit which drives the display device; an illumination system which switches an illuminating direction of the display device; and a control unit which controls the display device driving circuit to alternately input different videos into the display device and which switches the illuminating direction of the illumination system in synchronization with the input of each video to thereby display in the display device the different videos in a time sharing manner, the method comprising the steps of: inserting, between one video and the next video to be input into the display device, a reset signal to reset the one video; allowing the illumination system to start light emission at the earliest timing that is a timing when a transmittance of a lower end of the display device is brought into a shield state in response to the reset signal from a state where the lower end of the display device displays one video; and allowing the illumination system to stop the light emission at the latest timing that is a timing when display of the next video is started in an upper end of the display device.

An eighth aspect of the present invention is directed to the video display method according to the seventh aspect, further comprising the steps of: allowing the illumination system to start the light emission at a timing when the display of the next video is started after the transmittance of the lower end of the display device has been brought into the shield state; and allowing the illumination system to stop the light emission at a timing when a transmittance of the upper end of the display device is brought into a shield state in response to the reset signal from a state where the upper end of the display device displays the next video.

A ninth aspect of the present invention is directed to the video display method according to the seventh or eighth aspect, wherein the control unit sets the timings of the start and the stop of the light emission of the illumination system between the timing when the transmittance is brought into the shield state and the timing when the display of the next video is started so that quantities of lights to be transmitted through the upper end and the lower end of the display device in one scan with respect to the same signal are substantially equal to each other.

A tenth aspect of the present invention is directed to a video display method which displays videos corresponding to a plurality of observers, respectively, by use of a video display apparatus comprising a display device; a display device driving circuit which drives the display device; an illumination system which switches an illuminating direction of the display device; and a control unit which controls the display device driving circuit to alternately input different videos into the display device and which switches the illuminating direction of the illumination system in synchronization with the input of each video to thereby display in the display device the different videos in a time sharing manner, the method comprising the steps of: inserting, between one video and the next video to be input into the display device, a reset signal to reset the one video; allowing the illumination system to start light emission between a time when a transmittance of the display device is brought into a shield state in response to the reset signal from a state where the lower end of the display device displays one video and a time when display of the next video is started in the lower end of the display device; and allowing the illumination system to stop the light emission between the time when the transmittance of the display device is brought into the shield state in response to the reset signal from a state where an upper end of the display device displays the next video and a time when display of the further next video is started in the upper end of the display device.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
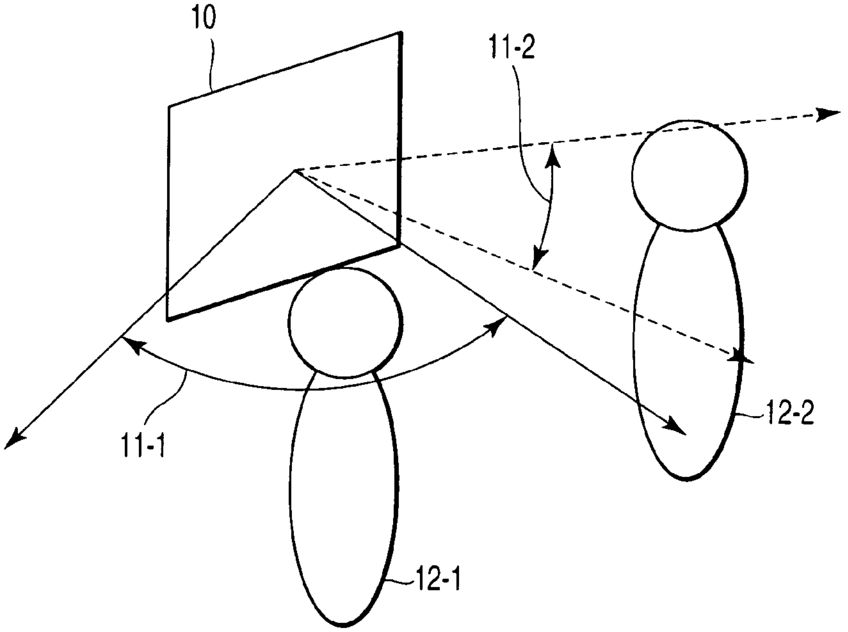
FIG. 1 is a diagram showing one application of a video display apparatus according to the present invention.

Embodiments of the present invention will be hereinafter described in detail with reference to the drawings. FIG. 1 is a diagram showing one application of a video display apparatus according to the present invention. In front of the right side of one display screen 10, a first observer 12-1 is present who observes the display screen 10 from the left side. In front of the left side of the display screen 10, a second observer 12-2 is present who observes the display screen 10 from the right side. Since the first observer 12-1 is present in a first video observation region 11-1, the observer can observe a left-side video formed by a first luminous flux. Since the second observer 12-2 is present in a second video observation region 11-2, the observer can observe a right-side video formed by a second luminous flux. That is, both the observers can observe the videos at the same time.

Figure 2:
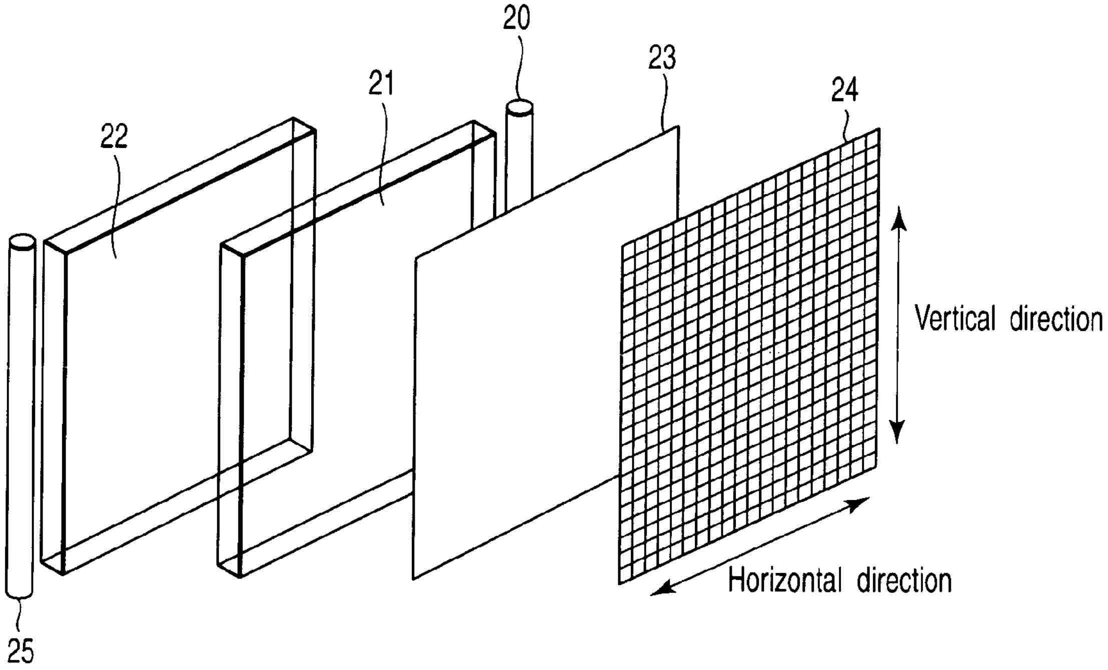
FIG. 2 is a diagram showing a basic constitution of the video display apparatus according to the present invention.

FIG. 2 is a diagram showing a basic constitution of the video display apparatus according to the present invention. In order from the observer's position, there are arranged a liquid crystal display device 24, a light diffusion device 23, a left-side light guide plate 21 and a right-side light guide plate 22. Thus, the present embodiment has a constitution in which the left-side light guide plate 21 and the right-side light guide plate 22 are doubly superimposed. A left-side light source 20 for backlight is disposed adjacent to one end of the left-side light guide plate 21, and a right-side light source 25 for backlight is disposed adjacent to an end portion of the right-side light guide plate 22 on a side opposite to the one end of the left-side light guide plate 21. That is, the left-side light source 20 and the right-side light source 25 are disposed in the different left and right positions with respect to the left-side light guide plate 21 and the right-side light guide plate 22.

The light diffusion device 23 is disposed between the left-side light guide plate 21 and the liquid crystal display device 24 to decrease illumination unevenness and the like. Here, the videos are separated in a horizontal direction to obtain two directivities. Therefore, if light excessively diffuses in the horizontal direction, two videos might be mixed and seen as a double video. In consequence, it is here preferable to use the light diffusion device in which the diffusion of the horizontal direction is suppressed rather than diffusion of a vertical direction.

Moreover, the left-side light guide plate 21 and the right-side light guide plate 22 are each made by forming special grooves, tilts or protrusions in a transparent member, and each of these plates emit, only in a certain direction having a directivity, light introduced through a side surface thereof. Any type of the left-side light source 20 and the right-side light source 25 can be used, so long as each of these light sources can light up from one direction of each of the left-side light guide plate 21 and the right-side light guide plate 22. For example, the left-side light source 20 and the right-side light source 25 may be columnar light sources such as cold cathode tubes, or light sources such as LEDs may be arranged and used.

Figure 3:
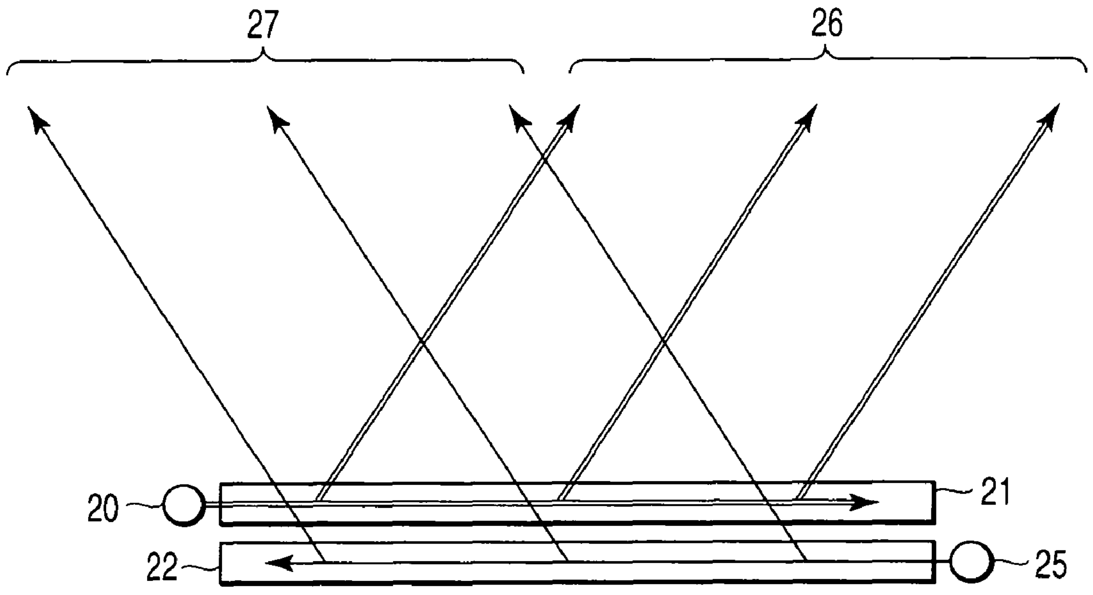
FIG. 3 is a horizontally sectional view of illumination means of the video display apparatus according to the present invention.

FIG. 3 is a horizontally sectional view of illumination means of the video display apparatus according to the present invention. The left-side light guide plate 21 is superimposed on the right-side light guide plate 22. The left-side light source 20 is disposed adjacent to one end (the left end in the drawing) of the left-side light guide plate 21, and the right-side light source 25 is disposed adjacent to an end portion (the right end in the drawing) of the right-side light guide plate 22 on the side opposite to one end (the left end) of the left-side light guide plate 21. As understood from FIG. 3, in this embodiment, the positions where the left-side light source 20 and the right-side light source 25 are disposed are different from each other with respect to the left-side light guide plate 21 and the right-side light guide plate 22.

In the following, it is assumed that a direction (the upper direction in the drawing) which comes close to an observer's position is a forward direction. The light introduced into the left-side light guide plate 21 from the left-side light source 20 is transmitted through the left-side light guide plate 21 while being totally reflected. In this case, when the surface of the left-side light guide plate 21 or a part of the surface is subjected to a special surface treatment or the surface is formed into a special shape, the light emitted from the left-side light guide plate 21 can be directed only in a first observer direction as a first video illumination 26. On the other hand, the light introduced into the right-side light guide plate 22 from the right-side light source 25 is transmitted through the right-side light guide plate 22 while being totally reflected. In this case, when the surface of the right-side light guide plate 22 or a part of the surface is subjected to a special surface treatment or the surface is formed into a special shape, the light emitted from the right-side light guide plate 22 can be directed only in a second observer direction as a second video illumination 27. A front and rear positional relation of the arrangement between the left-side light guide plate 21 and the right-side light guide plate 22 can arbitrarily be selected.

Figure 4:
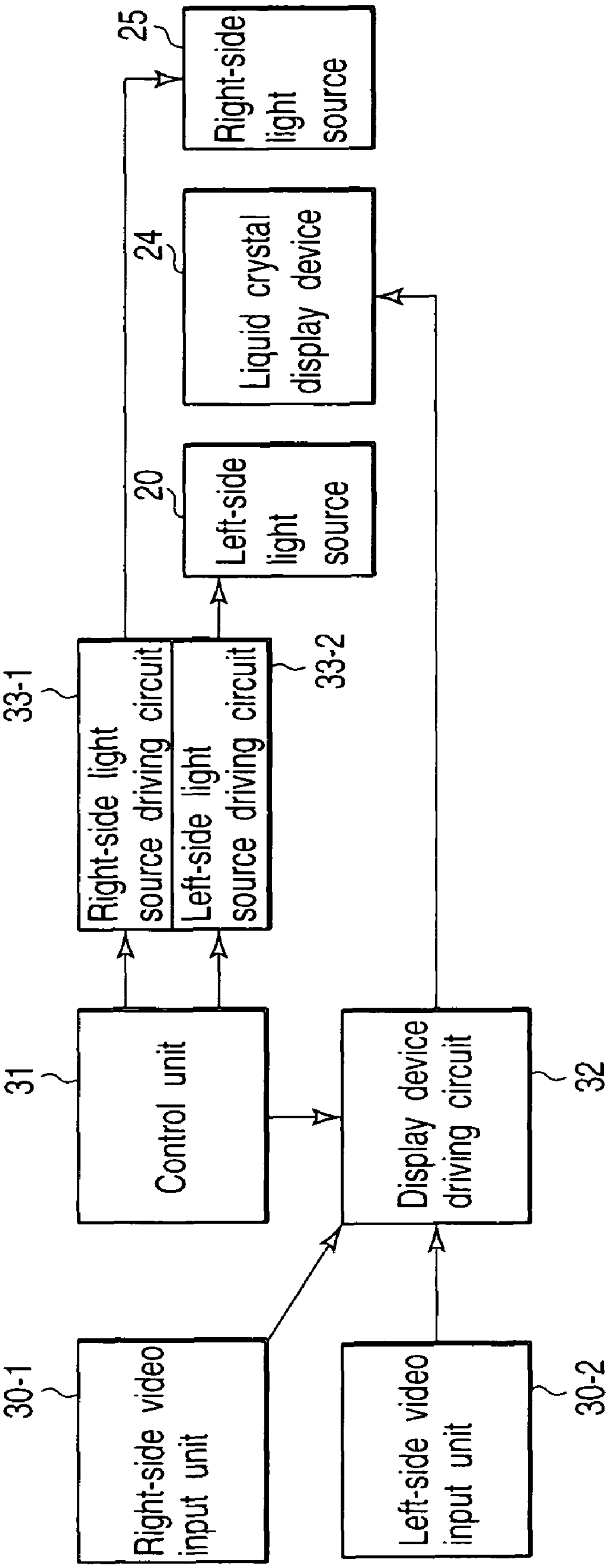
FIG. 4 is a block diagram showing a schematic constitution of the present video display apparatus.
Figure 7:
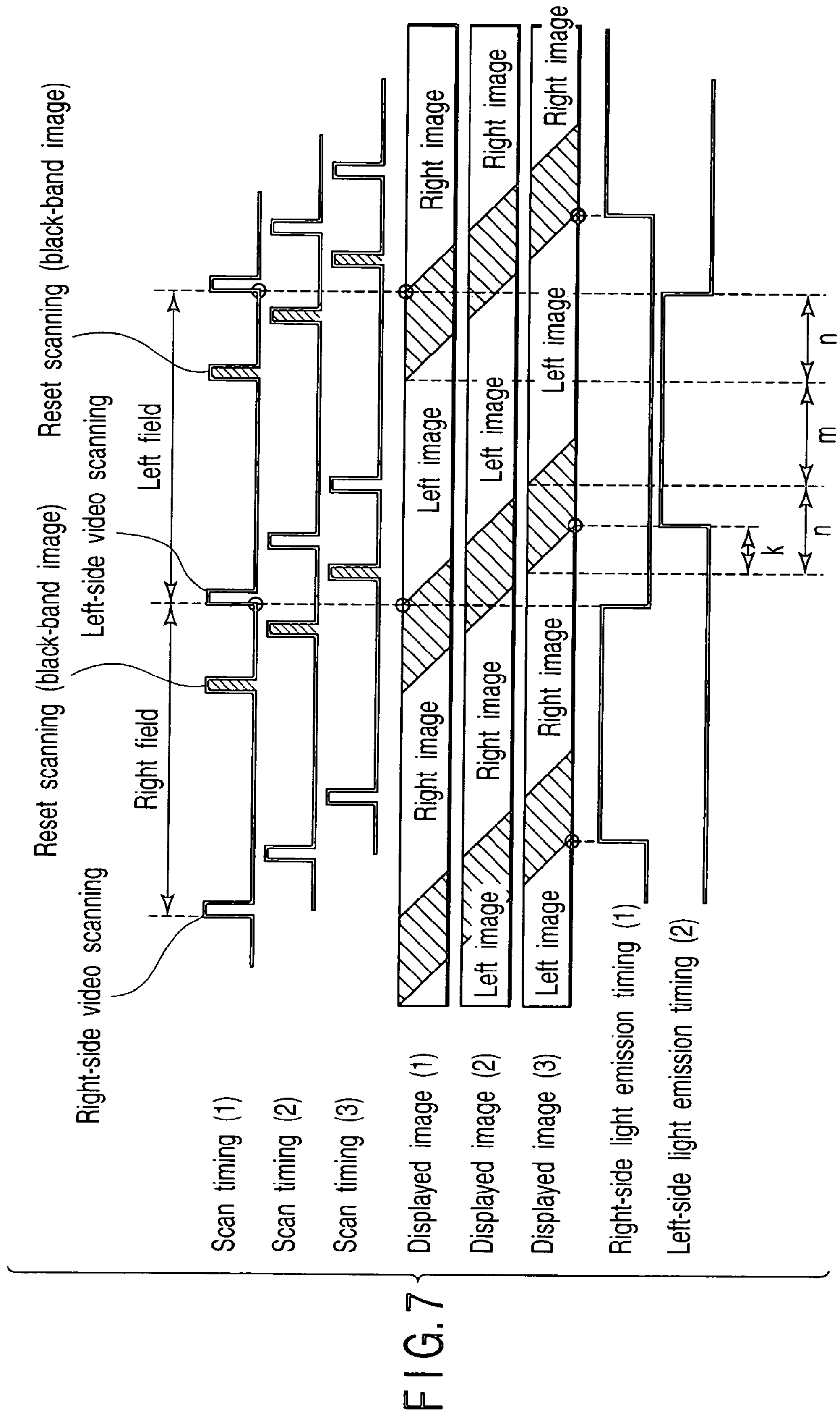
FIG. 7 is a diagram showing a behavior in which images are switched and displayed in accordance with the LCD driving shown in FIG. 6.
Figure 8:
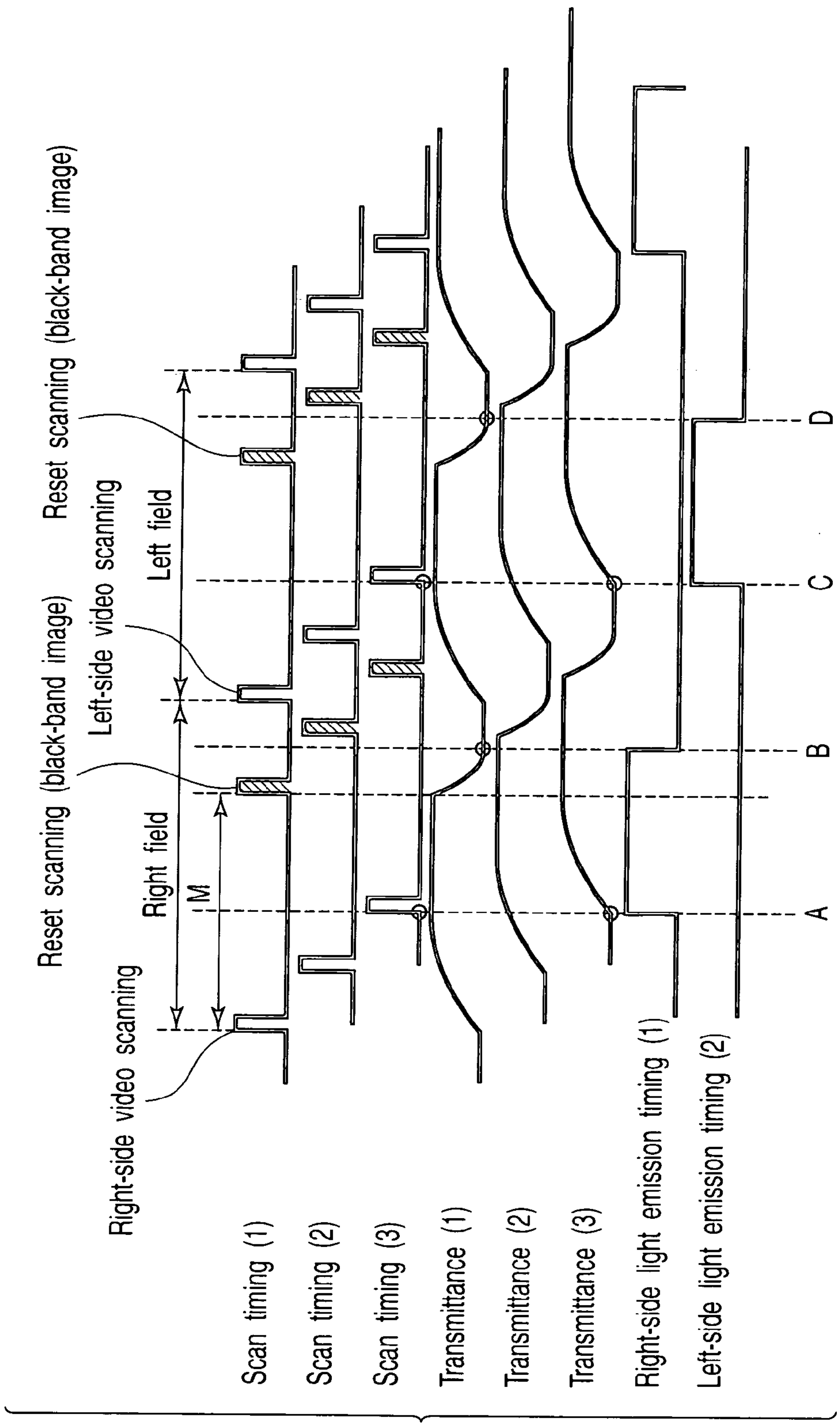
FIG. 8 is a diagram showing LCD driving and light emission timings in a third embodiment of the present invention.

FIG. 4 is a block diagram showing a schematic constitution of the present video display apparatus. A right video signal and a left video signal output from a right-side video input unit 30-1 and a left-side video input unit 30-2 enter a display device driving circuit 32. The display device driving circuit 32 processes these signals to generate a video display device driving signal, and a left image is displayed in the liquid crystal display device 24 and scanned downwards from above (left scanning). After a predetermined time a has elapsed from the start of the scanning of the left image, a black image is similarly displayed and scanned downwards from above if necessary (reset scanning). Furthermore, after a predetermined time b has elapsed from the start of the scanning of the black image, a right image is displayed and scanned downwards from above (right scanning). After the predetermined time a has elapsed from the start of the scanning of the right image, the black image is similarly displayed and scanned downwards from above if necessary (reset scanning). When the above steps are repeated, the left image, a black-band image and the right image are displayed as a result in the liquid crystal display device 24 as shown in, for example, FIG. 7 described later. It is to be noted that FIGS. 7, 8 show a case of a>T, but it may be a<T, wherein T is a time required from the start of the scanning of an upper end portion of the screen of the liquid crystal display device 24 to the end of the scanning of a lower end portion thereof.

A control unit 31 controls the display device driving circuit 32, a right-side light source driving circuit 33-1 and a left-side light source driving circuit 33-2 to display the videos at the above timings and to perform on-off operations of the left-side and right-side light sources 20, 25.

First Embodiment

A first embodiment of the present invention will be hereinafter described with reference to FIG. 5. Vertical synchronous signals corresponding to scan timings 1 to 3 shown in an upper stage of FIG. 5 indicate timings when scanning operations of video signals are started in an upper end, center and lower end of a screen, respectively. The abscissa indicates time. The vertical synchronous signals are output with slight deviations owing to time delays in the upper end, center and lower end of the screen.

Figure 5:
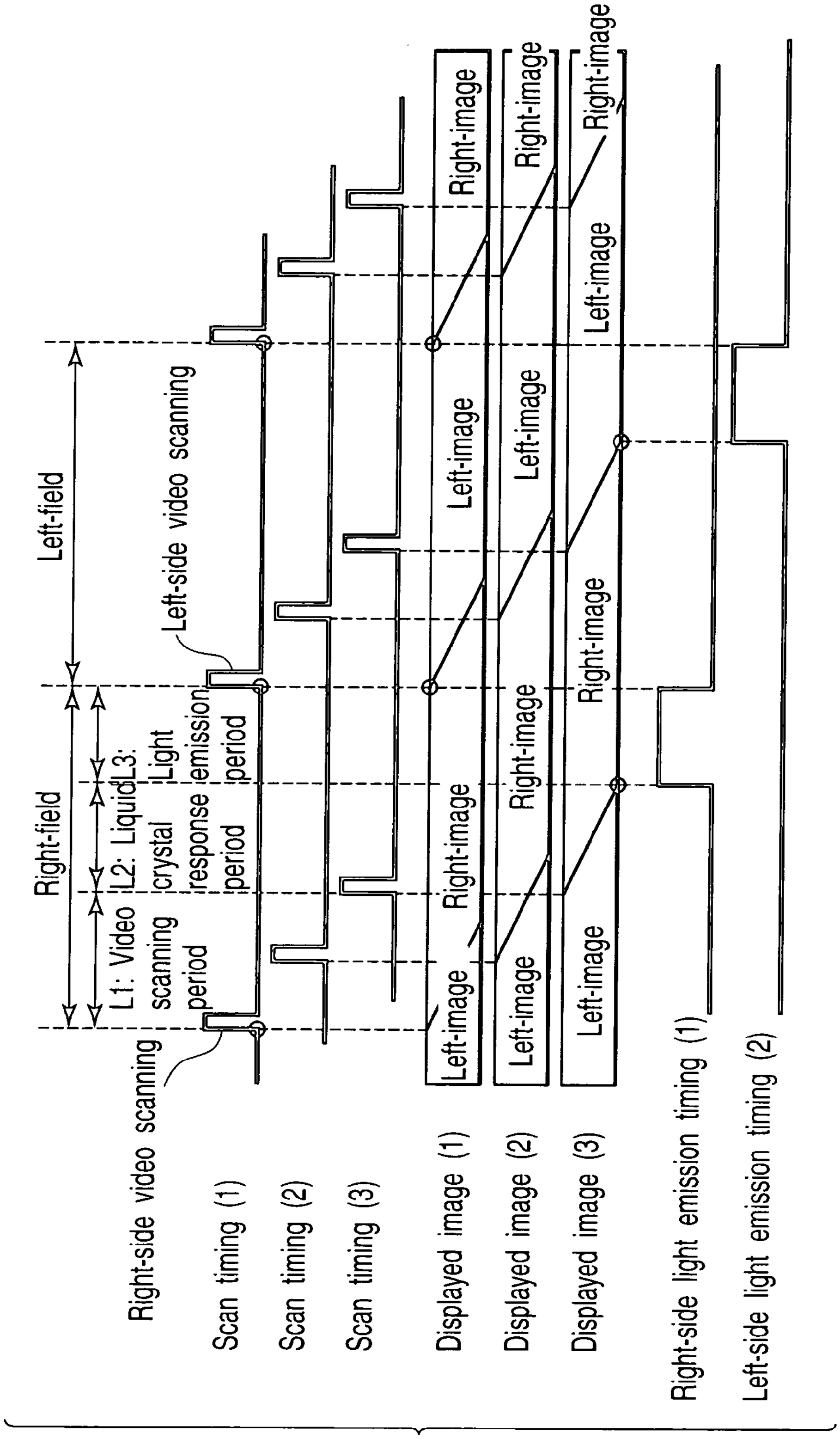
FIG. 5 is a diagram showing LCD driving and light emission timings in a first embodiment of the present invention.

Graphs of displayed images (1) to (3) in an intermediate stage of FIG. 5 show a behavior in which a right video and a left video are alternately displayed in the upper end, center and lower end of the screen, and display timings are synchronized with the above scan timings 1 to 3. As to the right video, transmittances of the liquid crystal display device 24 rise at the scanning start timings of the upper end, center and lower end of the screen, respectively, to successively start the display of the right video. After a predetermined response period has elapsed, a right image is completely displayed. Next, as to the left video, the transmittances of the liquid crystal display device 24 rise at the scanning start timings of the upper end, center and lower end of the screen, respectively, to successively start the display of the left video. After a predetermined response period has elapsed, a left image is completely displayed.

As shown in FIG. 5, a video scanning period (period denoted by L1) of the screen in the present invention is remarkably shorter than one field period. In consequence, there is given a period for which only one video (e.g., the right video or the left video) is displayed in the whole surface of the screen from the upper end to the lower end. In more detail, the control unit 31 controls the scan timings so that a sum of the video scanning period (period denoted by L1) from the upper end to the lower end concerning one video (right video or left video) input into the liquid crystal display device 24 and a liquid crystal response period (period denoted by L2) in the lower end of the screen of the liquid crystal display device 24 is smaller than one video field period.

Graphs of a lower end portion of FIG. 5 show light emission timings of the right-side light source 25 and the left-side light source 20. Here, the right-side light source 25 emits light between the end of the response period L2 in the lower end of the screen of the liquid crystal display device 24 during the scanning of the right video and the start of the next left video scanning in the upper end of the screen. Similarly, the left-side light source 20 emits light between the end of the response period in the lower end of the screen of the liquid crystal display device 24 during the scanning of the left video and the start of the next right video scanning in the upper end of the screen.

According to the first embodiment, in a liquid crystal display apparatus such as an MVD in which the right image and the left image are alternately displayed, backlights of the right image and the left image are collectively emitted to illuminate the videos without causing any crosstalk. In consequence, the bright and easily viewable video can be observed.

Second Embodiment

A second embodiment of the present invention will be hereinafter described with reference to FIGS. 6 and 7. In the same manner as in the first embodiment, a control unit 31 controls timings of scanning of a right-side video and a left-side video so that a sum of a video scanning period L1 from an upper end to a lower end concerning one video (the right video or the left video) input into a liquid crystal display device 24 and a liquid crystal response period L2 in the lower end of a screen of the liquid crystal display device 24 is smaller than one video field period. Furthermore, during the scanning of right video and left video signals, reset signals (hatched signals in FIGS. 6 and 7) for resetting the video signals are added.

Figure 6:
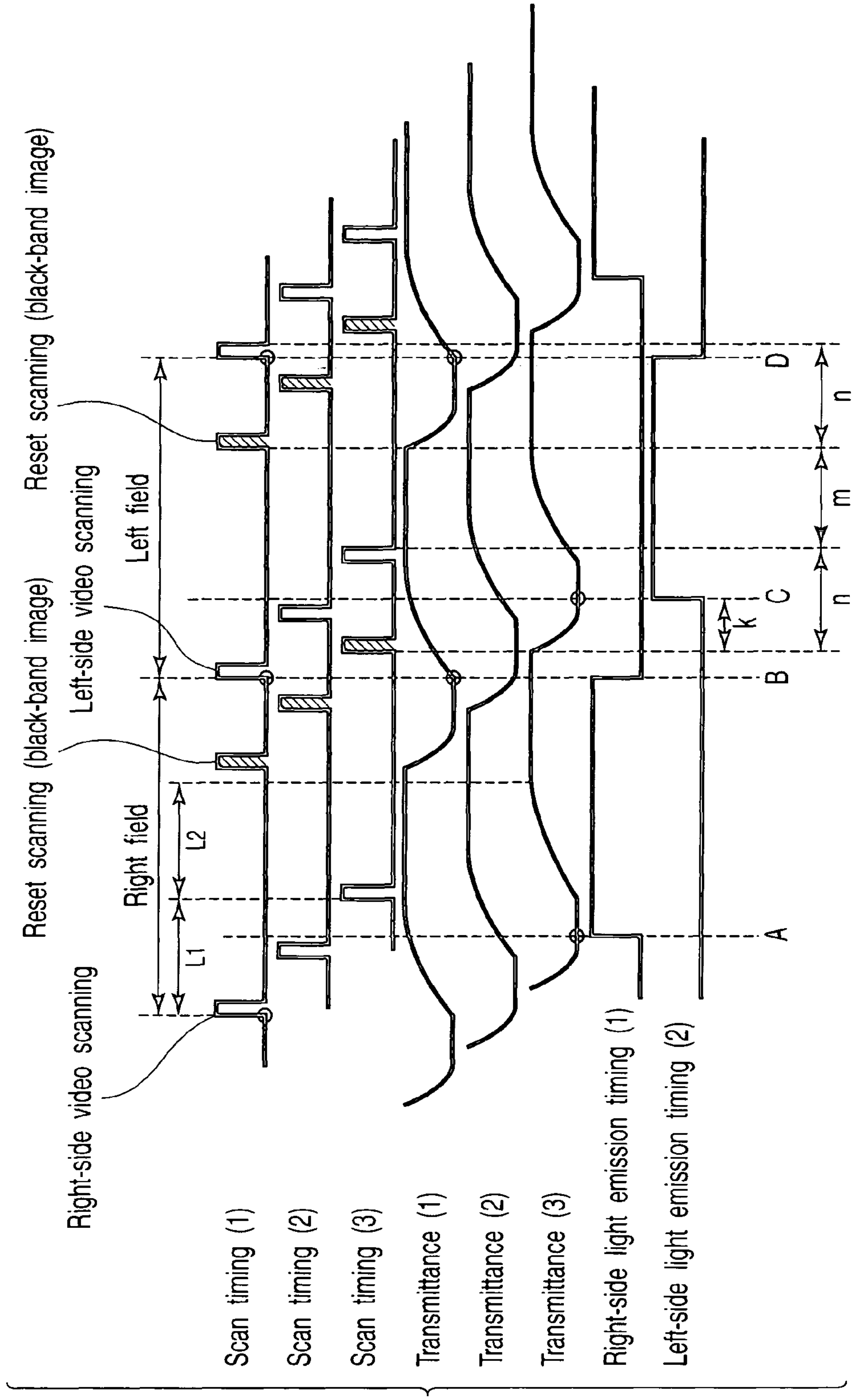
FIG. 6 is a diagram showing LCD driving and light emission timings in a second embodiment of the present invention.

In the second embodiment, as shown in FIG. 6, transmittances of the liquid crystal display device 24 rise at scanning start timings of the right video in an upper end, center and lower end of the screen, and after a predetermined response time has elapsed, they become transmittances corresponding to the input video signal. Next, a black-band video signal is input into the liquid crystal display device 24 at a timing of the reset signal, so that the transmittances start to drop. After the predetermined response time has elapsed, the liquid crystal display device 24 is brought into a black display state. Subsequently, the black state is maintained until a left video scanning signal is input, and the above operation is repeated. This also applies to the left video.

Graphs of displayed images (1) to (3) in an intermediate stage of FIG. 7 show a behavior in which a right image, a black image and a left image are switched and displayed in accordance with changes of the transmittances of the liquid crystal display device 24 in the upper end, center and lower end of the screen, respectively.

A lower stage of FIG. 6 shows graphs indicating light emission timings of a left-side light source 20 and a right-side light source 25. These graphs show a light emission control at a time when a light emission time is set to be maximum (longest) in a region where there is not any crosstalk. The upper graph shows a timing (1) when the right-side light source 25 corresponding to the right-side video emits light, and the lower graph shows a timing (2) when the left-side light source 20 corresponding to the left-side video emits light.

As shown in FIG. 6, the light emission of the right-side light source 25 starts at a timing (A) when the lower end of the liquid crystal display device 24 receives the reset signal of one previous left field and is brought into the black display state after a response time has elapsed. The light emission stops at a timing (B) when the next left video field starts in the upper end of the screen. Similarly, the light emission of the left-side light source 20 starts at a timing (C) when the lower end of the liquid crystal display device 24 receives the reset signal of one previous right field and is brought into the black display state after the response time has elapsed. The light emission stops at a timing (D) when the next right video field starts in the upper end of the screen.

The above light emission control will further be described. In FIGS. 6 and 7, the light emission time is controlled to satisfy m<light emission time<m+2n−k, wherein m is a time from the lower end scanning stop of the video signal to the upper end scanning of the black-band video signal, n is a time from the start of the black-band video signal scanning at a certain point to the next scan of the video signal, and k is a time from white display to black display (transmittance of 10% or less) of the liquid crystal display device 24 in response to the scanning of the black-band video signal. This period is the longest light emission time when the light emission of the light source can collectively be switched without causing any crosstalk. When an appropriate light emission time is selected in this range of the timing, desired illumination switching can be performed without causing any crosstalk.

Third Embodiment

A third embodiment of the present invention will be hereinafter described with reference to FIGS. 8 and 9. The third embodiment is characterized in that in the constitution of the second embodiment, any light is not emitted from a light source in a period having low transmittances (e.g., less than 10%) in upper and lower ends of a screen to enhance a use efficiency of the light.

Here, a control unit 31 performs a control to start field scanning (scan timing 3) in the lower end of the screen in a time which is a half or less of a period (the period denoted with M in FIG. 8) from the start of field scanning (scan timing 1) concerning a right video in the upper end of the screen to the output of a reset signal.

An intermediate stage of FIG. 8 shows graphs indicating transmittances of a liquid crystal display device 24. The graphs show changes of transmittances (1 to 3) in a case where pixels of the upper end, center and lower end of the screen are noted, respectively, and the transmittances are synchronized with the above scan timings (1 to 3). As to a right video, the transmittances of the liquid crystal display device 24 rise at scanning start timings in the upper end, center and lower end of the screen, and after a predetermined response time has elapsed, they become transmittances corresponding to an input video signal. Next, at a timing of the reset signal, a signal corresponding to black display is input into the liquid crystal display device 24, so that the transmittances start to drop, and the liquid crystal display device 24 is brought into a black display state after a predetermined response period has elapsed. Afterward, the black state is maintained until a left video scanning signal is input, and the above operation is repeated.

Figure 9:
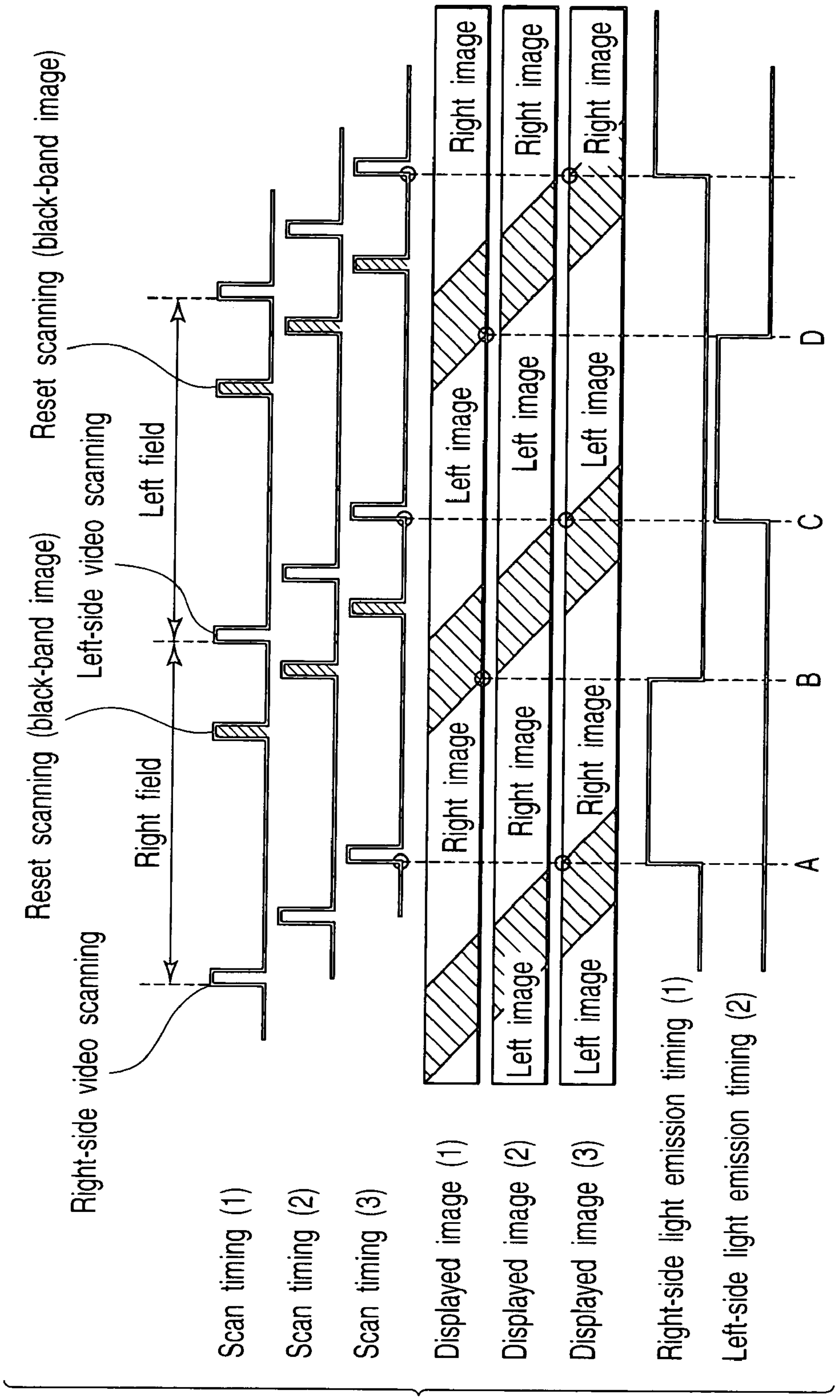
FIG. 9 is a diagram showing a behavior in which images are switched and displayed in accordance with the LCD driving shown in FIG. 8.

FIG. 9 shows a behavior in which a right image, a black image and a left image are switched and displayed in accordance with the changes of the transmittances of the liquid crystal display device 24 in the upper end, center and lower end of the screen, respectively.

A lower stage of FIG. 8 shows graphs indicating light emission timings of a left-side light source 20 and a right-side light source 25. The upper portion of the graphs shows a timing when the right-side light source 25 corresponding to the right-side video emits light, and the lower portion thereof shows a timing when the left-side light source 20 corresponding to a left-side video emits light.

At scan timing A of the right video in a lower end portion of the screen, the right-side light source 25 turns on. Then, after the upper end portion of the screen has received a reset signal, the right-side light source 25 turns off at scan timing B when the display state of the right image changes to the black display state with a delay corresponding to a response speed.

This also applies to the left-side light source 20. That is, at scan timing C of the left video in the lower end of the screen, the left-side light source 20 first turns on. Then, after the upper end portion of the screen has received a reset signal, the left-side light source 20 turns off at scan timing D when the display state of the left video changes to the black display state with a delay corresponding to a response speed.

As shown in FIG. 9, in a period between scan timing A when the right-side light source 25 turns on and scan timing B when the source turns off, the right video and black band are only displayed in the liquid crystal display device 24, and the left image is not displayed. Therefore, the illumination can collectively be switched without causing any crosstalk. In a period between scan timing C when the left-side light source 20 turns on and scan timing D when the source turns off, the left video and black band are only displayed in the liquid crystal display device 24, and the right image is not displayed. Therefore, the illumination can collectively be switched without causing any crosstalk.

Fourth Embodiment

Figure 16:
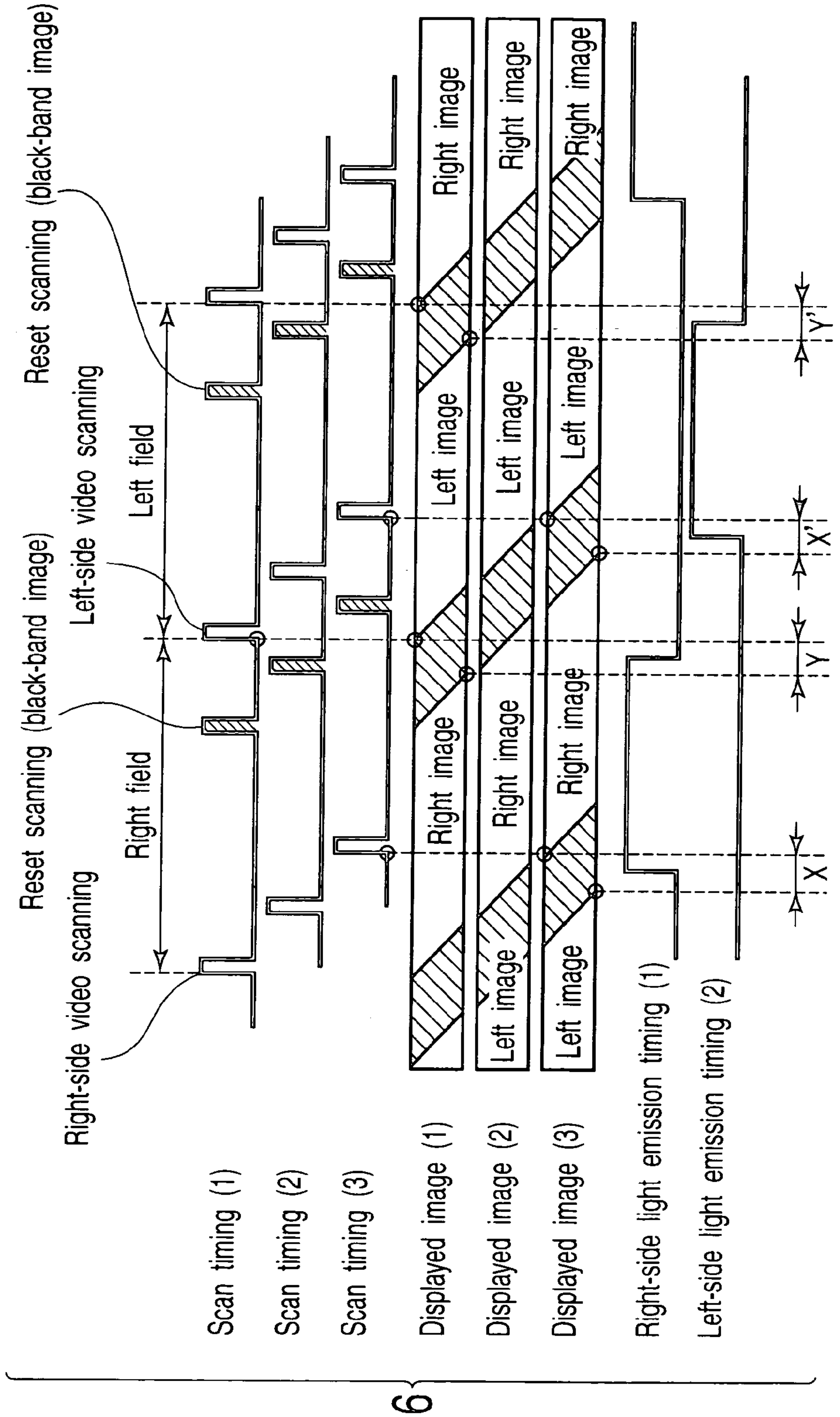
FIG. 16 is a diagram showing a fourth embodiment of the present invention.

A fourth embodiment of the present invention is a combination of the second embodiment and the third embodiment. FIG. 16 is a diagram to explain an outline of the fourth embodiment. Here, a control unit 31 turns on a right-side light source 25 at an arbitrary timing of a zone (X) between a timing to turn on the right-side light source 25 in the second embodiment and a timing to turn on the right-side light source 25 in the third embodiment. Moreover, the control unit 31 turns off the right-side light source 25 at an arbitrary timing of a zone (Y) between a timing to turn off the right-side light source 25 in the second embodiment and a timing to turn off the right-side light source 25 in the third embodiment. A left-side light source 20 may similarly be controlled to be on or off at an arbitrary timing of a period X' or Y'.

Fifth Embodiment

Figure 10:
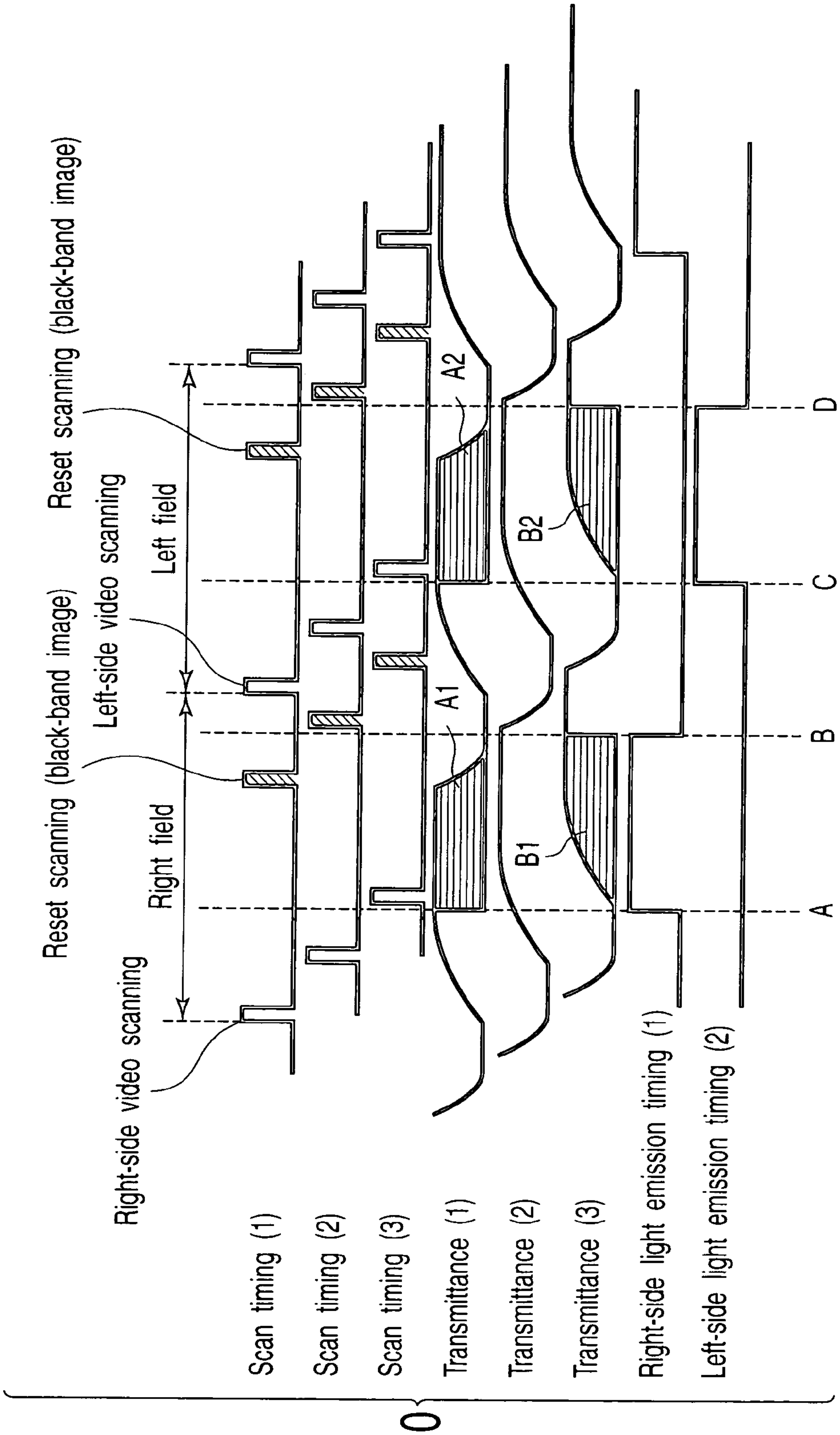
FIG. 10 is a diagram showing LCD driving and light emission timings in a fifth embodiment of the present invention.

A fifth embodiment of the present invention will be hereinafter described with reference to FIGS. 10 and 11. Since timings of scanning in a right field or left field are similar to those of the embodiments shown in FIGS. 6 to 9, detailed description thereof is omitted. In the embodiments of FIGS. 6 to 9 and FIG. 16, a light emission start timing of a light source is slightly before a black display state stops in a lower end of one previous field in a screen. Similarly, a timing of light emission stop is slightly after an upper end of the screen has been brought into the black display state. Since a liquid crystal display device 24 has a response period, a certain time is required until transmittances corresponding to an input signal have been reached. Moreover, integral values of liquid crystal transmittances in a light emitting period are proportional to a light emission luminance. Therefore, as shown in FIG. 10, a light emission period is controlled (a period between A and B is set as the light emission period during scanning of a right field, and a period between C and D is set as the light emission period during scanning of a left field) to decrease a difference between the integral values (areas denoted by A1 and B1, or A2 and B2) of the liquid crystal transmittances in the upper end and the lower end of the screen. In consequence, it is possible to decrease a difference between a quantity of light to be transmitted in the upper end of the screen and a quantity of light to be transmitted in the lower end of the screen. When the areas are set to be completely equal, a video having an equal brightness in both of the upper end and the lower end can be displayed in completely equal brightness.

Figure 11:
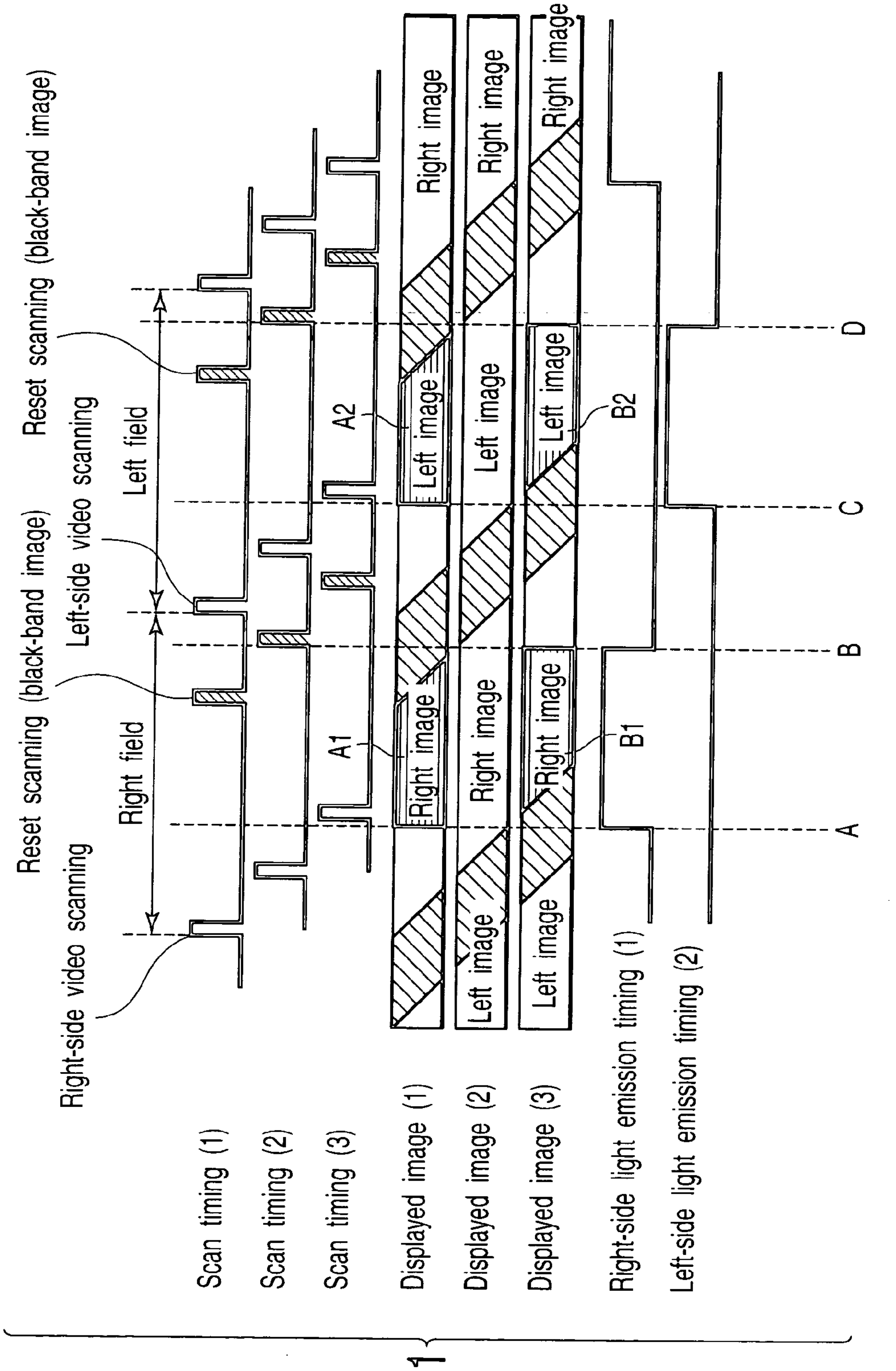
FIG. 11 is a diagram showing a behavior in which images are switched and displayed in accordance with the LCD driving shown in FIG. 10.

FIG. 11 is a diagram in which a relation between the integral values of the transmittances of the liquid crystal display device in the upper end and the lower end of the screen described with reference to FIG. 10 is shown with the integral values (areas denoted by A1 and B1, or A2 and B2) of the displayed image.

Sixth Embodiment

A sixth embodiment of the present invention will be hereinafter described in detail with reference to FIG. 12. Unlike the above first embodiment, the sixth embodiment does not satisfy a condition that a sum of a video scanning period from an upper end to a lower end of a screen concerning one video (right video or left video) input into a liquid crystal display device 24 and a liquid crystal response period in the lower end of the screen of the liquid crystal display device 24 is smaller than one video field period. However, even in such a case, a reset signal is inserted during scanning of each field, whereby it is possible to solve a problem of crosstalk.

Figure 12:
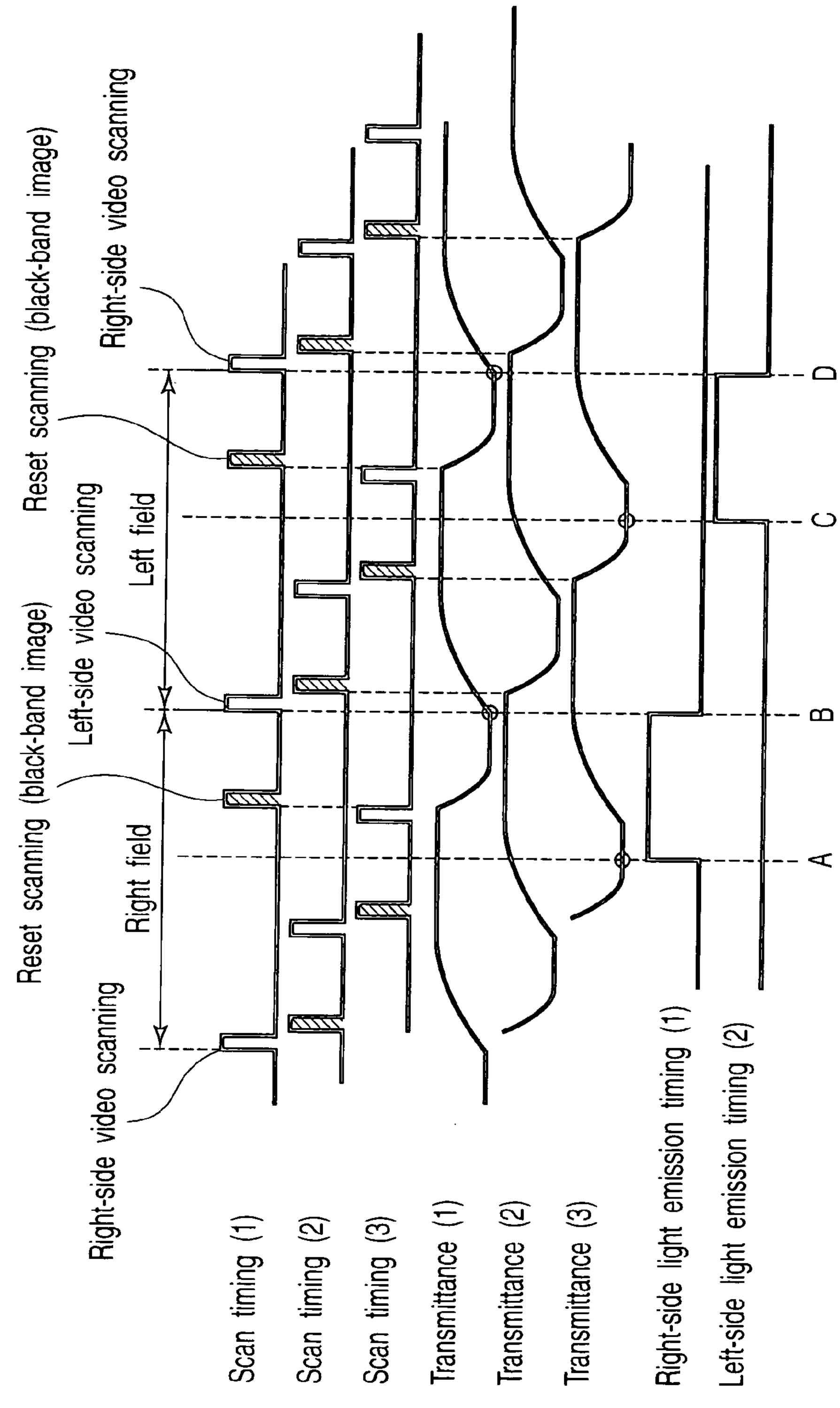
FIG. 12 is a diagram showing LCD driving and light emission timings in a sixth embodiment of the present invention.

In FIG. 12, scanning (scan timing 3) of the lower end of the screen concerning, for example, a right field starts immediately before the reset signal of the upper end of the screen is output. Even when such reset signal is inserted, a right image is not mixed with a left image. Even if backlight is turned on during response of the liquid crystal display device 24, any crosstalk is not caused. Moreover, scanning (scan timing 3) of the lower end of the screen concerning a left field starts immediately before a reset signal of the upper end of the screen is output. Therefore, a similar effect is obtained.

It is to be noted that a timing of light emission from each light source will be hereinafter described. That is, right-side light emission is started at a point (A) when transmittances of the liquid crystal display device 24 drop in response to output of the reset signal in the lower end of the screen during the scanning of the right field. Subsequently, after the transmittances of the liquid crystal display device 24 have dropped in response to the output of the reset signal in the upper end of the screen, the light emission stops at a start time (B) of the scanning of the next left video. Similarly, the light emission is started at a point (C) when the transmittances of the liquid crystal display device 24 drop in response to the output of the reset signal in the lower end of the screen during the scanning of the left field. Subsequently, after the transmittances of the liquid crystal display device 24 have dropped in response to the output of the reset signal in the upper end of the screen, the light emission stops at a start time (D) of the scanning of the next right video.

Figure 13:
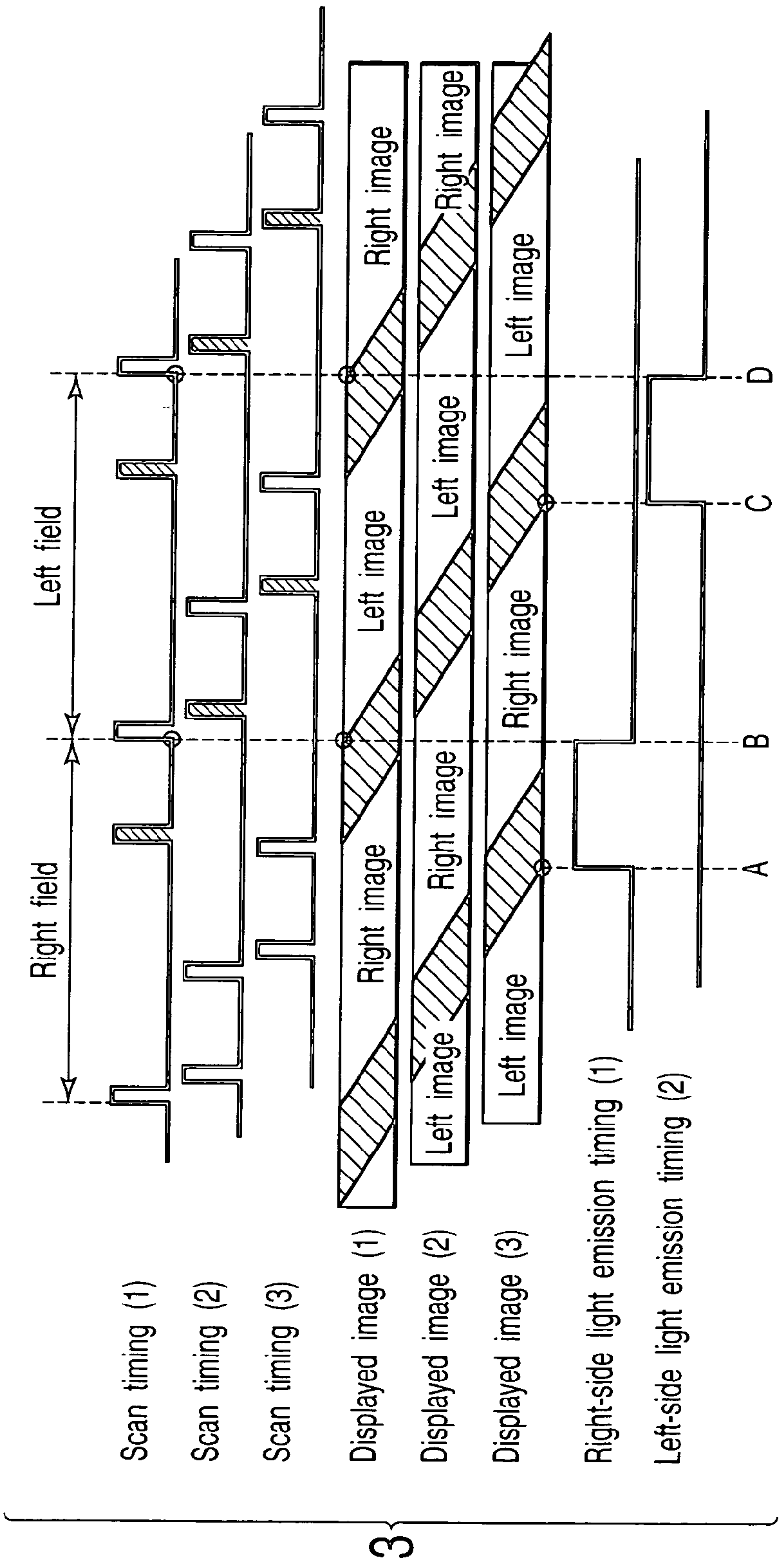
FIG. 13 is a diagram showing a behavior in which images are switched and displayed in accordance with the LCD driving shown in FIG. 12.

FIG. 13 shows a behavior in which the right image, a black image and the left image are switched and displayed in accordance with changes of the transmittances of the liquid crystal display device 24 in the upper end, center and lower end of the screen, respectively.

Seventh Embodiment

Figure 14:
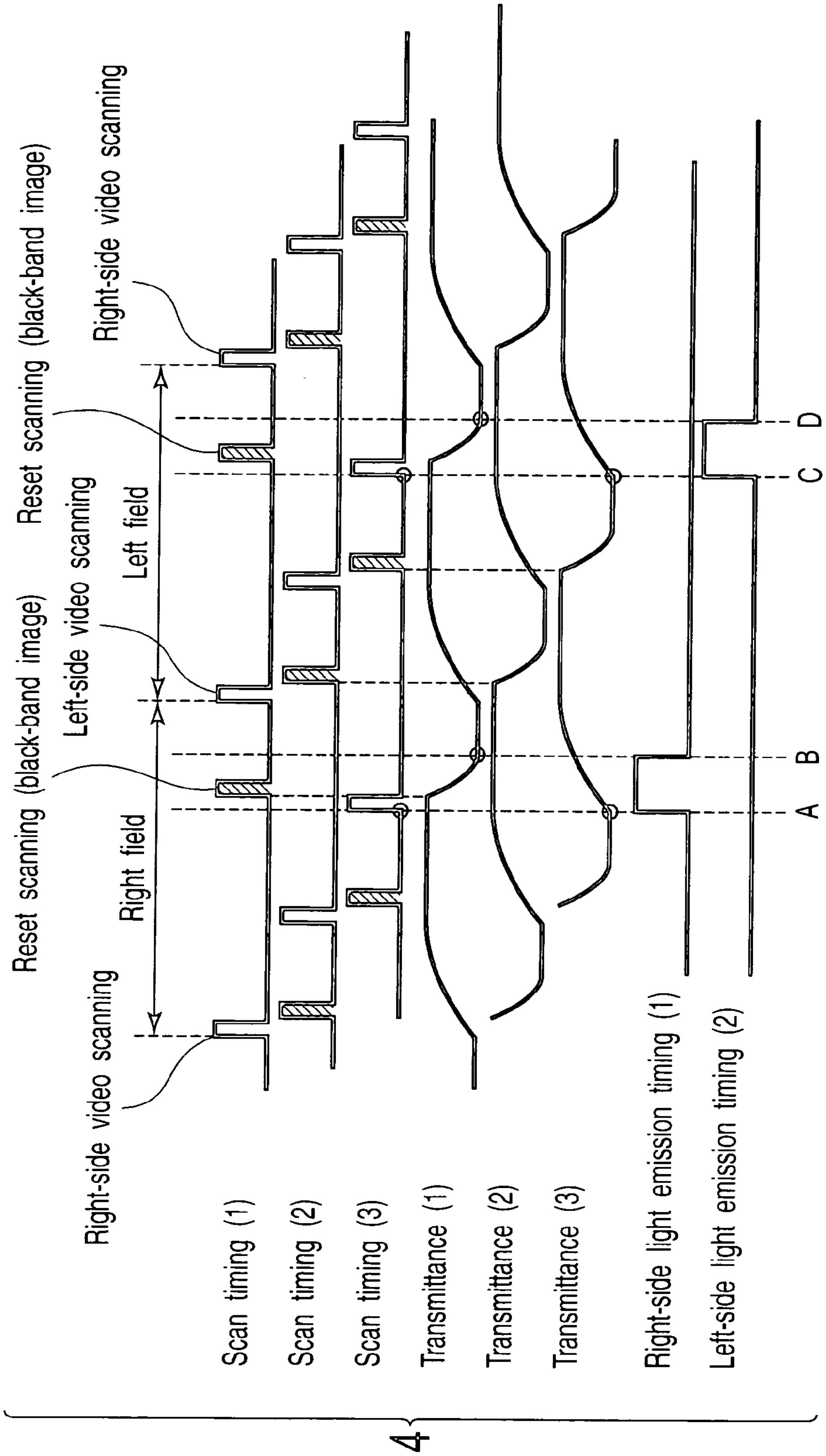
FIG. 14 is a diagram showing LCD driving and light emission timings in a seventh embodiment of the present invention.

A seventh embodiment of the present invention will be hereinafter described in detail with reference to FIGS. 14, 15. The seventh embodiment is characterized in that in the embodiment of FIGS. 12 and 13, in a period having low transmittances (e.g., less than 10%) in upper and lower ends of a screen, a light source does not emit any light to enhance a use efficiency of the light.

It is to be noted that light emission timings of a right-side light source 25 and a left-side light source 20 will be hereinafter described. That is, right-side light emission is started at a time (A) when right-side scanning is started in the lower end of the screen, after the transmittance of a liquid crystal display device 24 has dropped in response to output of a reset signal in the lower end of the screen. Subsequently, the light emission stops at a time (B) immediately after the transmittance of the liquid crystal display device 24 in the lower end has dropped in response to the output of the reset signal in the upper end of the screen. Similarly, left-side light emission is started at a time (C) when left-side scanning is started in the lower end, after the transmittance of the liquid crystal display device 24 has dropped in response to the output of the reset signal in the lower end of the screen. Subsequently, the light emission stops at a time (D) immediately after the transmittance of the liquid crystal display device 24 in the lower end has dropped in response to the output of the reset signal in the upper end of the screen.

Figure 15:
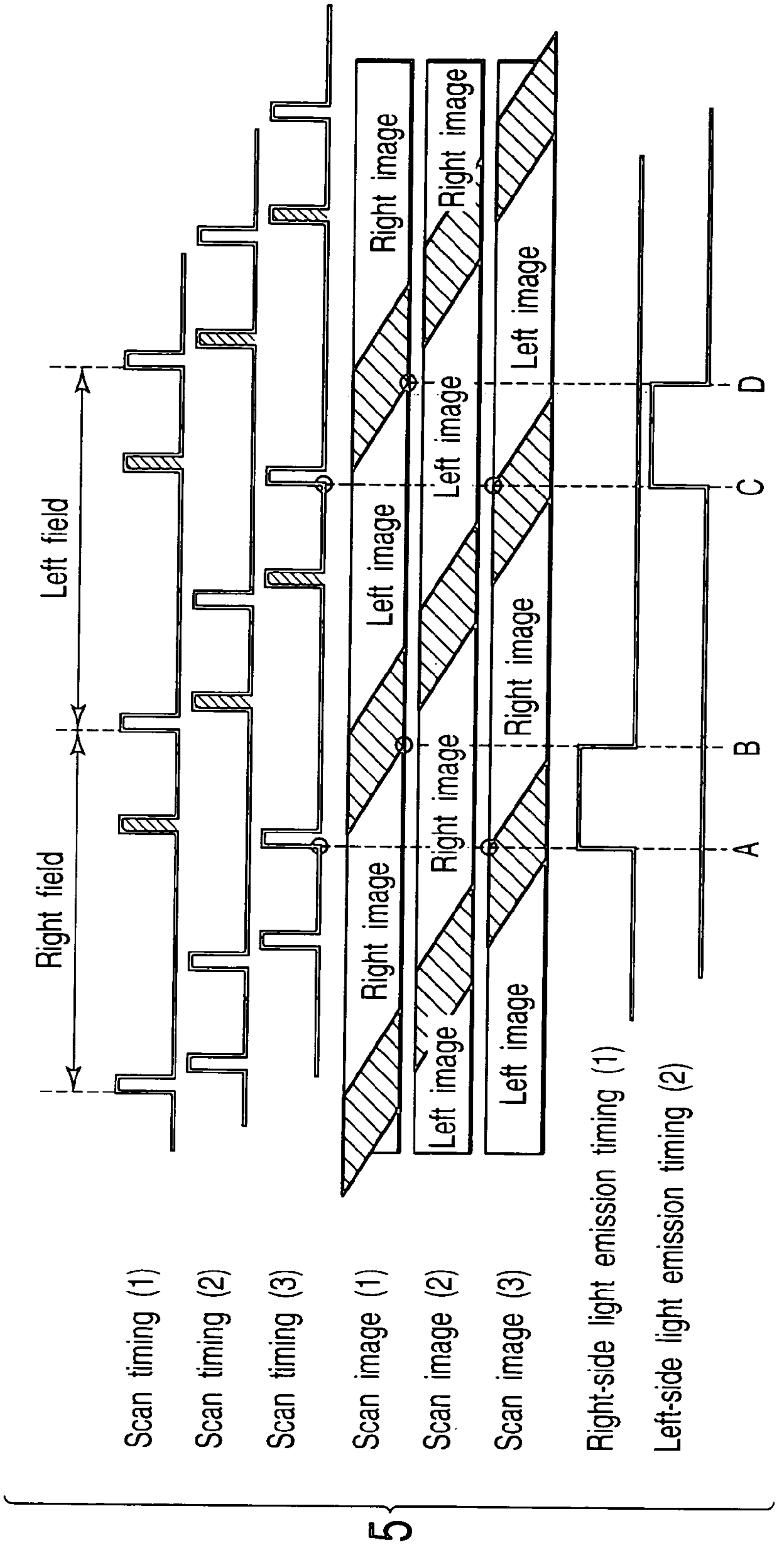
FIG. 15 is a diagram showing a behavior in which images are switched and displayed in accordance with the LCD driving shown in FIG. 14.

FIG. 15 shows a behavior in which a right image, a black image and a left image are switched and displayed in accordance with changes of the transmittances of the liquid crystal display device 24 in the upper end, center and lower end of the screen, respectively.

Eighth Embodiment

Figure 17:
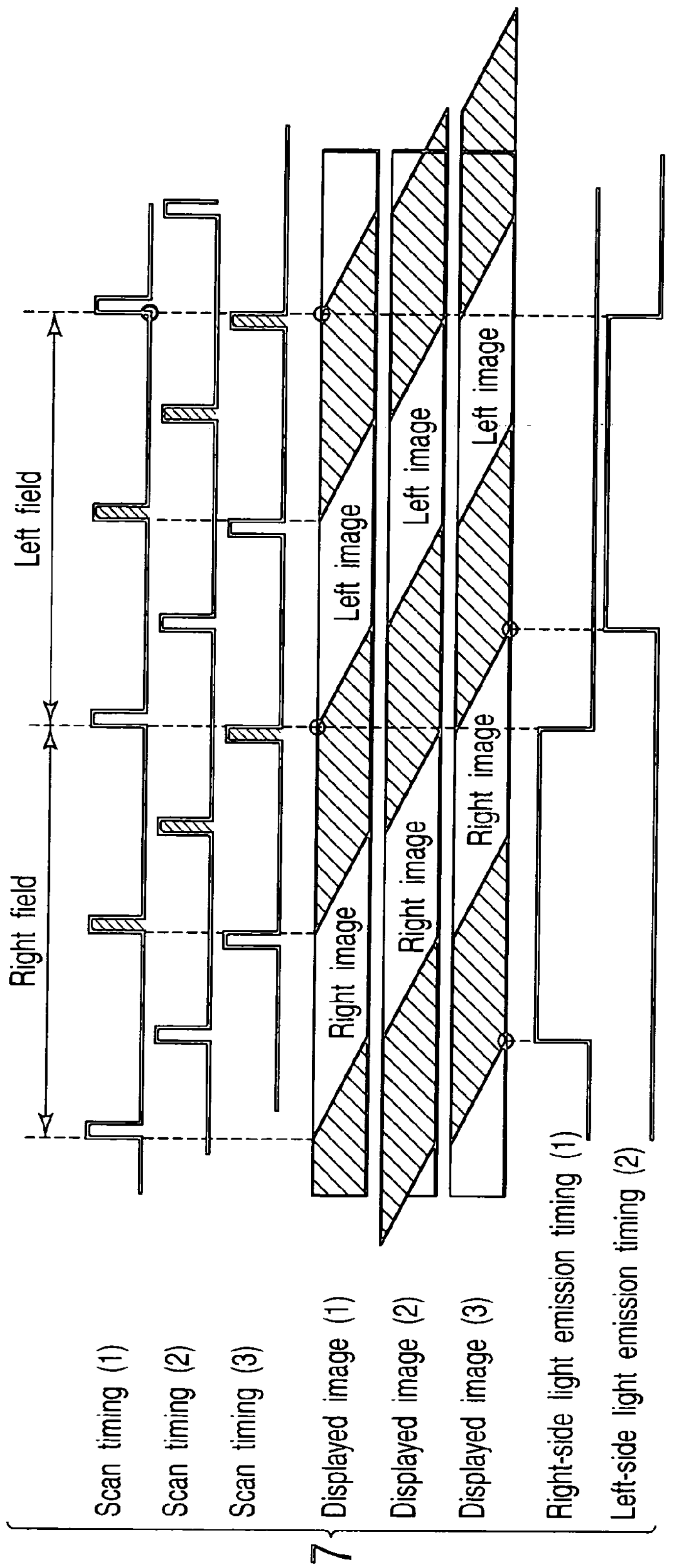
FIG. 17 is a diagram showing LCD driving and light emission timings in an eighth embodiment of the present invention.
Figure 18:
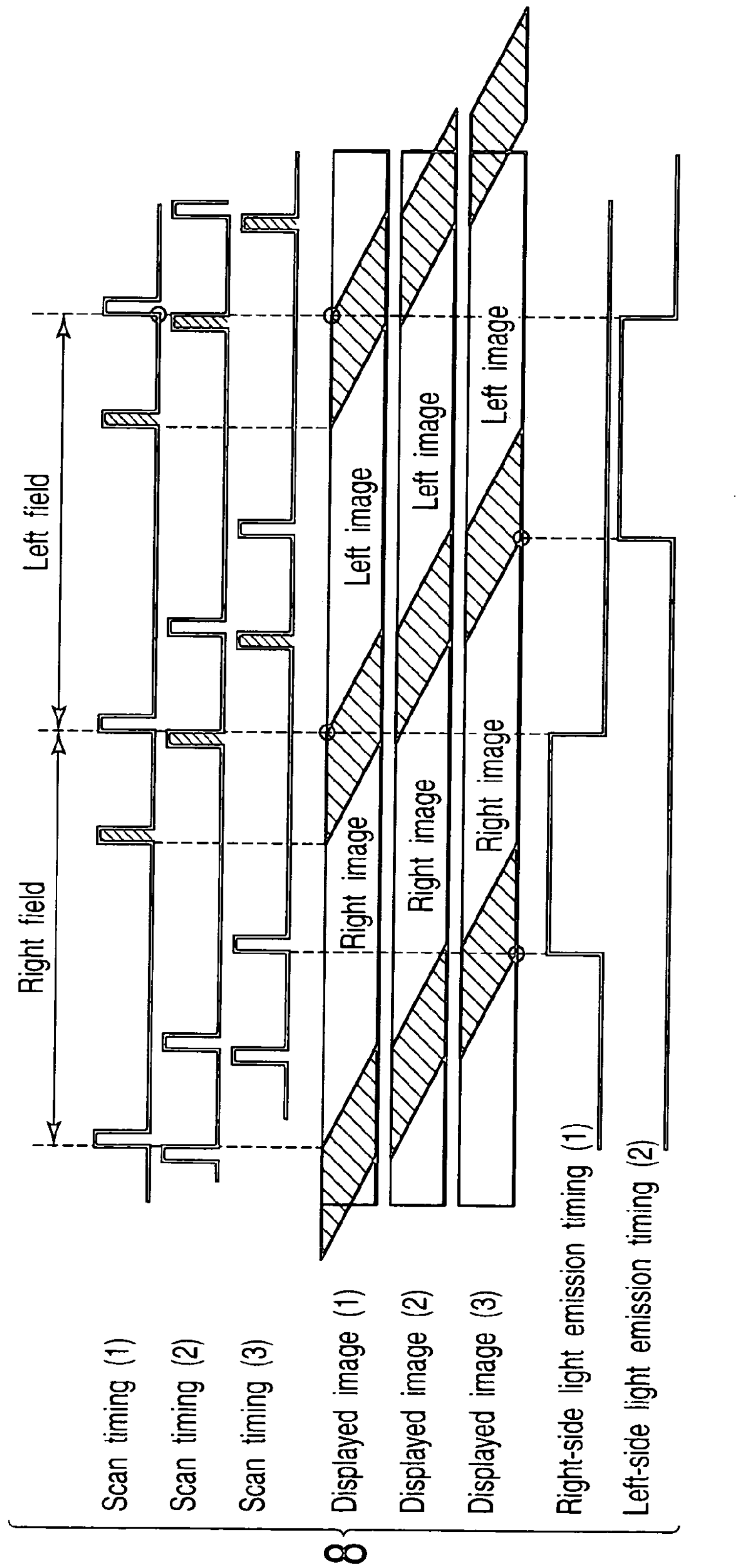
FIG. 18 is a diagram showing a behavior in which images are switched and displayed in accordance with the LCD driving shown in FIG. 17.
Figure 19:
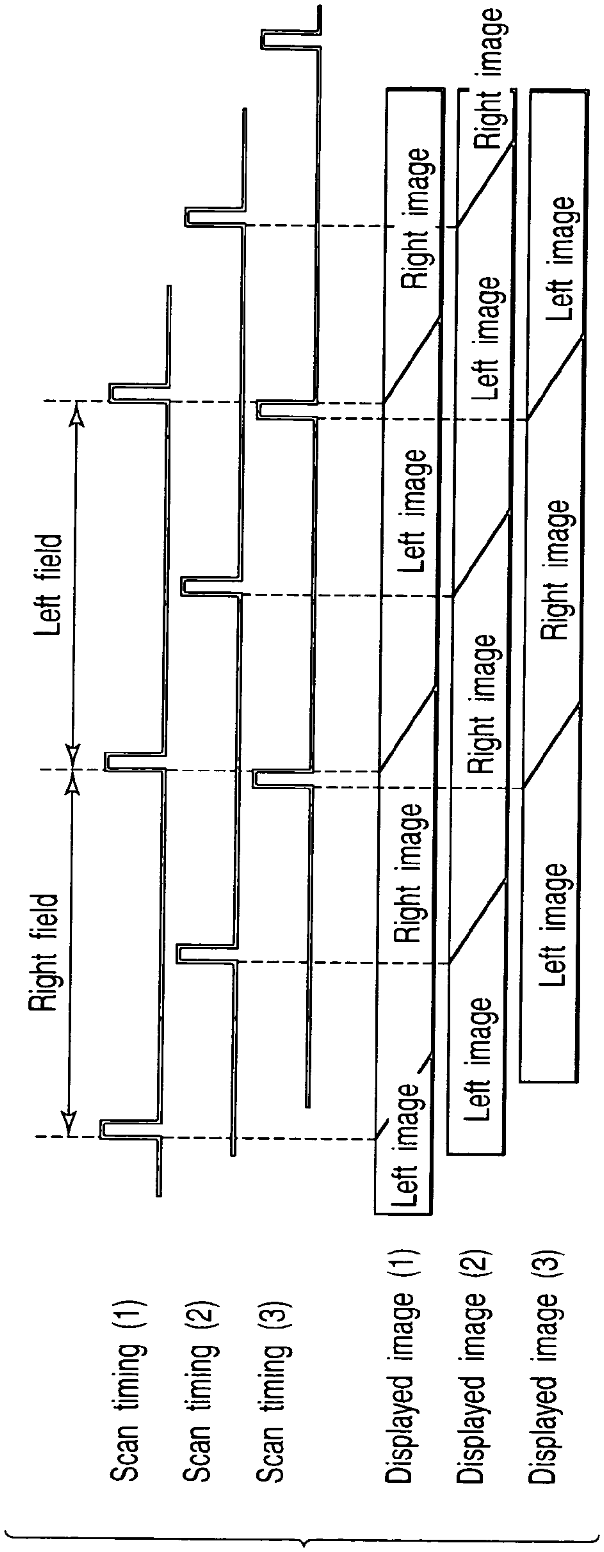
FIG. 19 (PRIOR ART)
FIG. 19 is a diagram showing a behavior of the driving of an MVD by a conventional scanning technology.

An eighth embodiment of the present invention will be hereinafter described while FIG. 17 and FIG. 18 are compared. FIG. 17 shows images 1, 2 and 3 displayed in accordance with scan timings 1, 2 and 3 in an upper end, center and lower end of a screen, and light emission timings 1 and 2 in a conventional example. Such an example is disclosed in Jpn. Pat. No. 3,569,522. As apparent from FIG. 17, a reset signal (hatched signal in FIG. 17) in the lower end of a screen in a right field is output before a scanning start signal (vertical synchronous signal) in the upper end of the screen in the next left field. On the other hand, as shown in FIG. 18 of the eighth embodiment, before a reset signal (hatched signal in FIG. 18) in a lower end of a screen in a right field, a scanning start signal (vertical synchronous signal) in an upper end of a screen in a next left field is output. According to such a scanning control, as compared with the conventional example, a ratio of a video display period with respect to a light emission time increases. In consequence, more efficient illumination is possible.

What is claimed is:

1. A video display apparatus capable of displaying videos corresponding to a plurality of observers, respectively, the apparatus comprising:

a display device;

a display device driving circuit which drives the display device;

an illumination system which switches an illuminating direction of the display device; and a control unit which controls the display device driving circuit to alternately input different videos into the display device and which switches the illuminating direction of the illumination system in synchronization with the input of each video to thereby display in the display device the different videos in a time sharing manner, wherein the control unit controls a scan timing so that a sum of a video scanning period from an upper end to a lower end of the display device concerning one video input into the display device and a response period in the lower end of the display device is smaller than a field period of the video; and the control unit allows the illumination system to emit light between the end of the response period of the lower end and the start of scanning of the next video in the upper end of the display device.

2. A video display apparatus capable of displaying videos corresponding to a plurality of observers, respectively, the apparatus comprising:

a display device;

a display device driving circuit which drives the display device;

an illumination system which switches an illuminating direction of the display device; and a control unit which controls the display device driving circuit to alternately input different videos into the display device and which switches the illuminating direction of the illumination system in synchronization with the input of each video to thereby display in the display device the different videos in a time sharing manner, wherein the control unit inserts, between one video and the next video to be input into the display device, a reset signal to reset the one video; the control unit allows the illumination system to start light emission at the earliest timing that is a timing when a transmittance of a lower end of the display device is brought into a shield state in response to the reset signal from a state where the lower end of the display device displays one video; and the control unit allows the illumination system to stop the light emission at the latest timing that is a timing when display of the next video is started in an upper end of the display device.

3. The video display apparatus according to claim 2, wherein the control unit allows the illumination system to start the light emission at a timing when the display of the next video is started after the transmittance of the lower end of the display device has been brought into the shield state; and the control unit allows the illumination system to stop the light emission at a timing when a transmittance of the upper end of the display device is brought into a shield state in response to the reset signal from a state where the upper end of the display device displays the next video.

4. The video display apparatus according to claim 2 or 3, wherein the control unit sets the timings of the start and the stop of the light emission of the illumination system between the timing when the transmittance is brought into the shield state and the timing when the display of the next video is started so that quantities of lights to be transmitted through the upper end and the lower end of the display device in one scan with respect to the same signal are substantially equal to each other.

5. A video display apparatus capable of displaying videos corresponding to a plurality of observers, respectively, the apparatus comprising:

a display device;

a display device driving circuit which drives the display device;

an illumination system which switches an illuminating direction of the display device; and a control unit which controls the display device driving circuit to alternately input different videos into the display device and which switches the illuminating direction of the illumination system in synchronization with the input of each video to thereby display in the display device the different videos in a time sharing manner, wherein the control unit inserts, between one video and the next video to be input into the display device, a reset signal to reset the one video; the control unit allows the illumination system to start light emission between a time when a transmittance of the display device is brought into a shield state in response to the reset signal from a state where the lower end of the display device displays one video and a time when display of the next video is started in the lower end of the display device; and the control unit allows the illumination system to stop the light emission between the time when the transmittance of the display device is brought into the shield state in response to the reset signal from a state where an upper end of the display device displays the next video and a time when display of the further next video is started in the upper end of the display device.

6. A video display method which displays videos corresponding to a plurality of observers, respectively, by use of a video display apparatus comprising:

a display device;

a display device driving circuit which drives the display device;

an illumination system which switches an illuminating direction of the display device; and a control unit which controls the display device driving circuit to alternately input different videos into the display device and which switches the illuminating direction of the illumination system in synchronization with the input of each video to thereby display in the display device the different videos in a time sharing manner, the method comprising the steps of:

controlling a scan timing so that a sum of a video scanning period from an upper end to a lower end of the display device concerning one video input into the display device and a response period in the lower end of the display device is smaller than a field period of the video; and allowing the illumination system to start light emission between the end of the response period of the lower end and the start of scanning of the next video in the upper end of the display device.

7. A video display method which displays videos corresponding to a plurality of observers, respectively, by use of a video display apparatus comprising:

a display device;

a display device driving circuit which drives the display device;

an illumination system which switches an illuminating direction of the display device; and a control unit which controls the display device driving circuit to alternately input different videos into the display device and which switches the illuminating direction of the illumination system in synchronization with the input of each video to thereby display in the display device the different videos in a time sharing manner, the method comprising the steps of:

inserting, between one video and the next video to be input into the display device, a reset signal to reset the one video;

allowing the illumination system to start light emission at the earliest timing that is a timing when a transmittance of a lower end of the display device is brought into a shield state in response to the reset signal from a state where the lower end of the display device displays one video; and allowing the illumination system to stop the light emission at the latest timing that is a timing when display of the next video is started in an upper end of the display device.

8. The video display method according to claim 7, further comprising the steps of:

allowing the illumination system to start the light emission at a timing when the display of the next video is started after the transmittance of the lower end of the display device has been brought into the shield state; and allowing the illumination system to stop the light emission at a timing when a transmittance of the upper end of the display device is brought into a shield state in response to the reset signal from a state where the upper end of the display device displays the next video.

9. The video display method according to claim 7 or 8, wherein the control unit sets the timings of the start and the stop of the light emission of the illumination system between the timing when the transmittance is brought into the shield state and the timing when the display of the next video is started so that quantities of lights to be transmitted through the upper end and the lower end of the display device in one scan with respect to the same signal are substantially equal to each other.

10. A video display method which displays videos corresponding to a plurality of observers, respectively, by use of a video display apparatus comprising:

a display device;

a display device driving circuit which drives the display device;

an illumination system which switches an illuminating direction of the display device; and a control unit which controls the display device driving circuit to alternately input different videos into the display device and which switches the illuminating direction of the illumination system in synchronization with the input of each video to thereby display in the display device the different videos in a time sharing manner, the method comprising the steps of:

inserting, between one video and the next video to be input into the display device, a reset signal to reset the one video;

allowing the illumination system to start light emission between a time when a transmittance of the display device is brought into a shield state in response to the reset signal from a state where the lower end of the display device displays one video and a time when display of the next video is started in the lower end of the display device; and allowing the illumination system to stop the light emission between the time when the transmittance of the display device is brought into the shield state in response to the reset signal from a state where an upper end of the display device displays the next video and a time when display of the further next video is started in the upper end of the display device.

* * * * *